Patented Sept. 24, 1940

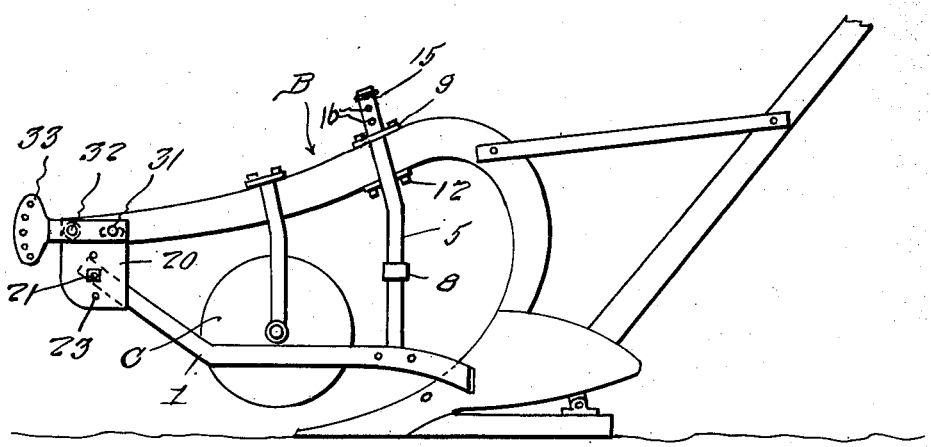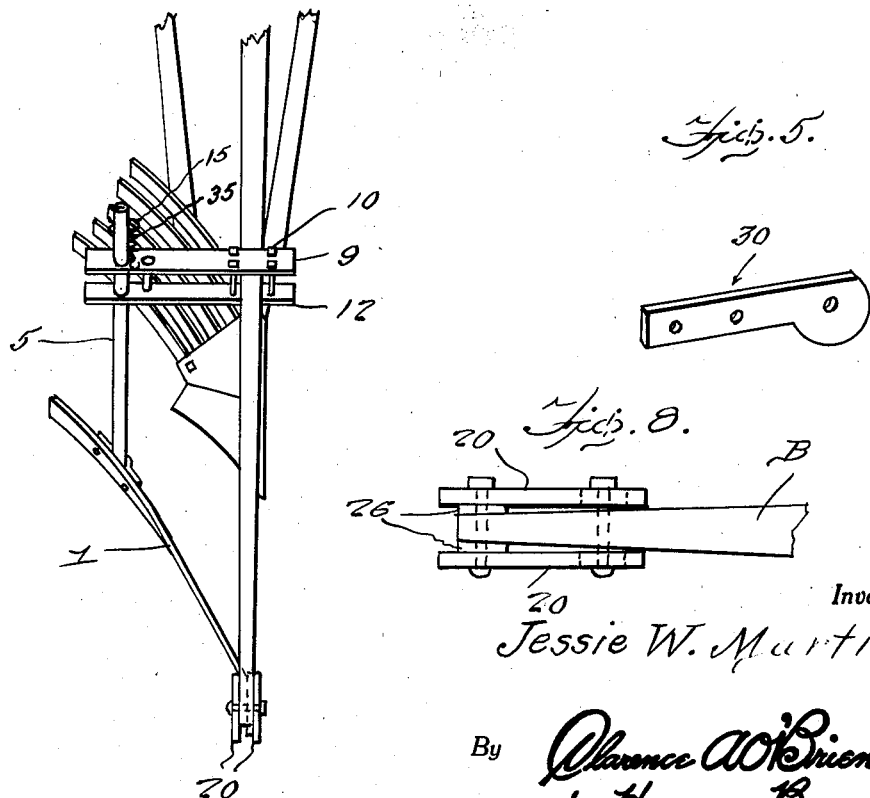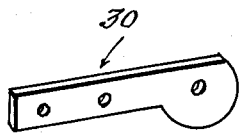

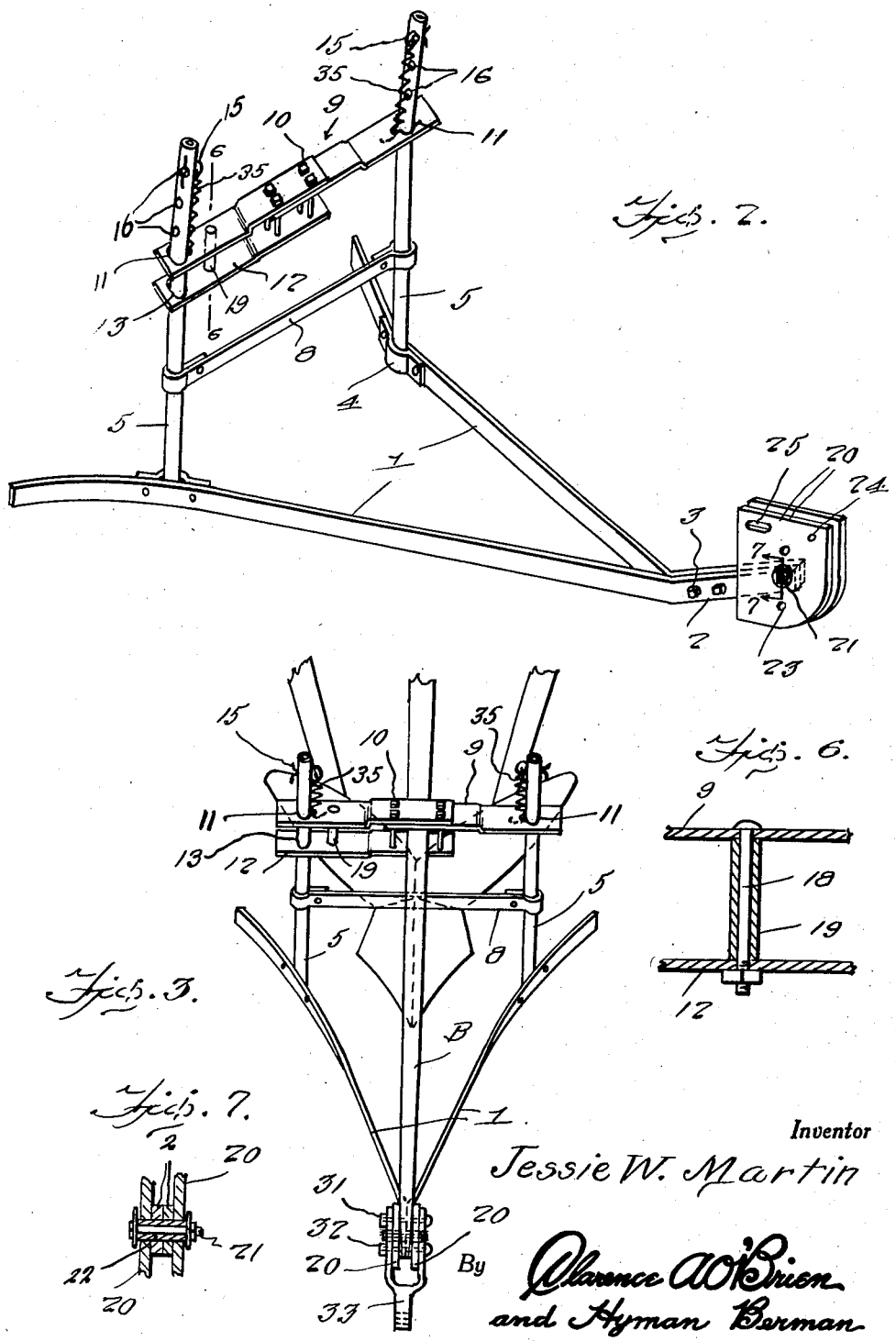

2,216,085

UNITED STATES PATENT OFFICE 2,216,085

ATTACHMENT FOR PLOWS

Jessie W. Martin, Reform, Ala.

Application January 17, 1940, Serial No. 314,345

3 Claims. (Cl. 97—193)

This invention relates to an attachment for plows, the general object of the invention being to provide means for facilitating the turning under of vegetable matter by the plow by providing a wing member adjustably connected with the plow and having limited vertical movement, such wing member spreading out and flattening vegetation so that it can be readily plowed under by the following plow.

Another object of the invention is to provide means whereby the device can be readily changed from a double winged member used for "middle busters" or a single wing member in use with an ordinary type of plow.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is an elevation showing the invention in use on a "middle buster" plow and also combined with a disk coulter.

Figure 2 is a perspective view of the device shown in Figure 1.

Figure 3 is a top plan view of Figure 1 and showing the coulter removed.

Figure 4 is a top plan view showing a single wing type of device used with an ordinary plow.

Figure 5 is a view of a bracket used with the device shown in Figure 4.

Figure 6 is a section on the line 6—6 of Figure 2.

Figure 7 is a section on the line 7—7 of Figure 2.

Figure 8 is a top plan view showing how the depending connecting plates of the device are attached to the beam of a plow.

As shown in these drawings the device comprises a pair of wings 1 which have short and straight front ends 2 which slope upwardly and contact each other and are detachably connected together by bolts 3. These wings are in the form of flat bars and they are divergently curved rearwardly as shown. Adjacent the rear ends the wings are connected by the brackets 4 to the lower ends of the posts 5 which have their upper ends curving forwardly and intermediate their ends the posts are connected together by a brace 8. An upper clamping member 9 is composed of two parts which have their inner ends overlapping and connected together by the bolts 10 and the outer ends of the two parts are provided with slots 11 through which the posts pass. A shorter lower clamping member 12 is of substantially the same length as one of the sections of the member 9 and has a slot 13 in its outer end through which a post passes and its inner end is provided with holes for receiving the bolts 10. These two members 9 and 12 act as clamping means for engaging the beam B of a plow so that they fasten the device to the beam but in a manner to permit the posts to move vertically through the slots 11 and 13 though this movement can be regulated by means of the cotter pins 15 passing through desired ones of holes 16 in the top portions of the posts. The two clamping members 9 and 12 are further connected together by a bolt 18, see Figure 6, which passes through holes in the member 12 and one section of member 9 immediately above it, said bolt also passing through a spacer 19 located between the two parts.

A pair of depending plates 20 pivotally support the device from the front end of the beam and the parts 2 of the wings pass between these plates and are pivotally connected thereto by the bolt 21 and the spacer 22, these parts passing through any one of a plurality of holes 23 in the plates, the holes being arranged in a vertical row. The plates 20 are provided with the holes 24 and the slots 25 for receiving fastening means for connecting them to the front end of the beam and if the beam is tapered as shown in Figure 8, shims 26 can be placed between the sides of the beam and the plates to make the plates parallel.

When the device is used on a "middle buster" or similar plow shown in Figures 1, 2 and 3 the double arrangement of wings and associated parts is used, but when the device is used with an ordinary plow such as shown in Figure 4 then one of the wings and one of the posts are removed and but one section of the clamping plate 9 is used so that this section and the section 12 clamp the beam of the single plow. Also a plate such as that shown at 30 in Figure 5 is fastened by the bolts 3 to the end 2 of the single wing used so that this part 2 of the wing and the plate 30 will make the front end of the wing thick enough to be properly positioned between the plates 20 which depend from the front end of the beam.

As shown in Figure 1 the slots 25 of the plates 20 receive a bolt 31 which passes through a hole in the front end of the beam and a bolt 32 passes through the holes 24 in the plates and through the front end of the beam and also through the shank of the clevis 33 of the beam.

From the foregoing it will be seen that this device is pivotally supported from the front end of the beam for swinging movement in a vertical plane and the posts or post support it for limited vertical movement from an intermediate part of the beam so that the wing structure can move upwardly or downwardly to a limited extent and said wing structure should be arranged adjacent the ground level when the plow is in the ground so that it will spread and flatten vegetation, such as vines and the like, so that the plow can readily plow them under.

Of course, when a double type of plow is used both wings should be used, but when a single type of plow such as shown in Figure 4 is used then one of the wings is removed. Whenever desired a disk coulter such as shown at C in Figure 1 can be used and when so used it will travel in the space between the two wings. Also as shown in this figure the major portion of each wing is substantially horizontally arranged but slopes upwardly and forwardly at its front end.

Where the vegetable growth is heavy then the wings can be pressed downwardly by means of the springs 35 which are attached at one end to the member 9 and the other ends to the upper ends of the posts so that the springs will tend to move the posts downwardly and thus yieldingly press the wings against the vines or plants. These springs can encircle the posts or they may be arranged as shown in the drawings with each spring having a hook at its lower end engaging a notch formed in a wall of a slot 11 and with its upper end engaging a part of the cotter pin 15 so that the spring will be adjusted as the cotter pin is adjusted.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. An attachment for a plow comprising a wing member, means for pivotally connecting the wing member to the front end of the beam of the plow, said wing member having its front end sloping downwardly and rearwardly and the rest of the member arranged substantially horizontally and curving outwardly and tending to spread and flatten vegetation in front of the plow and means for supporting the wing member from an intermediate part of the beam for vertical movement.

2. A plow attachment of the class described comprising a pair of wing members each including an upwardly extending front part and outwardly curved rear part substantially horizontally arranged, brackets depending from the beam of a plow and to which the front ends of the wings are pivoted, posts rising from the intermediate portions of the wings, clamping plates for clamping an intermediate part of the beam and having slots in their outer ends through which the posts pass for sliding movement, means for limiting the downward movement of the posts in the slots and a brace member connecting the posts together.

3. An attachment for a plow comprising a depending bracket adapted to be connected to the front end of the beam of the plow, a pair of wing members having upwardly and forwardly extending front parts detachably connected together, means for pivotally and adjustably connecting the front ends of said parts to the bracket, posts rising from the rear portions of the wings, a brace member connecting the posts together, upper and lower clamping plates adapted to be clamped to a beam, the upper plate being formed of two sections, said clamping plates having slots in their outer ends for the passage of the posts and means for limiting downward movement of the posts through the slots.

JESSIE W. MARTIN.